Oct. 6, 1953     R. NEWTON     2,654,247
GAS METER Filed April 12, 1946     3 Sheets-Sheet 1

INVENTOR
Robert Newton
by John H. Graham. HIS AGENT

Oct. 6, 1953          R. NEWTON          2,654,247

GAS METER

Filed April 12, 1946          3 Sheets-Sheet 2

INVENTOR
Robert Newton
By John F. Graham HIS AGENT

Oct. 6, 1953  R. NEWTON  2,654,247
GAS METER

Filed April 12, 1946  3 Sheets-Sheet 3

INVENTOR - Robert Newton. BY John Graham - HIS AGENT.

Patented Oct. 6, 1953

2,654,247

UNITED STATES PATENT OFFICE 2,654,247

GAS METER

Robert Newton, East Melbourne, Victoria, Australia

Application April 12, 1946, Serial No. 661,851
In Australia May 3, 1945

9 Claims. (Cl. 73—272)

This invention relates to improvements in gas meters and it refers particularly to dry gas meters of the type wherein the index mechanism and operating levers are not exposed to gas action.

There are two principal types of dry gas meters, commonly termed the "closed top" meter and the "open top" meter. In the closed top type of meter the valves of the meter are enclosed within a sealed box mounted on the upper surface of the valve plate so that gas cannot escape from that box to contaminate the index and the operating levers of the meter recording mechanism. The movements of the diaphragms of the meter are transmitted to the valves by means of flag rods projecting upwardly through the valve plate, and by operating levers connected to the upper ends of the flag rods and adapted to impart rotational movement to a crank. The flag rods are held within stuffing boxes mounted on the valve plate, the stuffing boxes being provided for the purpose of preventing escape of gas from the diaphragm chambers to the upper compartment of the meter. Also, the crank is rotatably mounted in a stuffing box which is secured to the box provided about the valves.

These three stuffing boxes are necessarily packed relatively tightly in order to prevent or restrict the escape of gas through them, and this causes resistance and therefore pressure absorption. It is also to be noted that it has been found, in gas meter construction, that gas should be made to change direction of flow as little as possible. As the path through which the gas is obliged to flow, in a closed top meter, has a relatively large number of turns there is a considerable resistance to the gas flow. Particularly is this the case when the rate of flow is increased beyond the flow-capacity for which the meter was designed. Consequently, as the pressure absorbed within the meter increases when the rate of flow of the gas increases, the flow-capacity of the meter is limited.

Therefore, in order to obtain a higher rate of flow of gas for substantially the same size of gas meter—with a more efficient operation—the open top type of meter has been designed. In this type of meter the valves are not enclosed within a box and the gas is admitted directly to the upper compartment of the meter. Consequently the gas flows in a path which has far fewer turns than does the gas path of a closed top meter. Also, the stuffing boxes in which the flag rods are mounted do not require to be packed as tightly as in the closed top type of meter owing to the fact that there is a substantial equalization of pressure on the opposite sides of the valve plate. In addition the stuffing box for the crank is dispensed with and relatively little resistance is offered by the stuffing box for the operating spindle to the index mechanism, which is required in the open top type of meter and is secured to the index housing. The elimination of the crank stuffing box and the relative looseness of the packing for the flag rod stuffing-boxes ensures a material reduction in the internal friction of the meter.

In consequence of the reduction of the internal friction within the open top gas meter the size of the valve ports may be increased with the result that the flow capacity of the meter will be increased far beyond the flow capacity of the closed top meter of the same size.

However, the open top type of meter has the disadvantage that the index stuffing box is subject to leakage, and thus the index mechanism as well as the operating levers are subjected to gas action and gummy deposits may form on the working parts, with consequential loss of efficiency. Moreover the index glass rapidly becomes discoloured and renders difficult the reading of the meter. It is also to be observed that the presence of gas in the upper or valve compartment makes the testing and adjusting of a meter rather more complicated than would be the case if the top compartment were gas free. In effecting adjustment of a meter it is necessary to fit a dummy top after an adjustment has been made, try the meter, then remove the top to effect further adjustments. This complex procedure greatly slows down the assembly of meters.

This invention has been devised primarily for the purpose of providing a gas meter which will combine the advantages of the open top meter with those of the closed top meter without the inherent disadvantages peculiar to the two different types. It is therefore a principal object of the invention to provide a dry gas meter formed with two compartments (for convenience termed the upper and lower compartments—the lower compartment containing the diaphragms and comprising the diaphragm chambers) in which the upper compartment will be kept free of gas so that the index and operating levers will not become contaminated; wherein the gas passageways will have relatively few bends or turns so that there is a minimum of restriction to the flow of gas; wherein liability of escape of gas through the internal gas connectors will be reduced; wherein the stuffing box for the crank and/or the index will be dispensed with; and wherein liability of escape of gas from the diaphragm compartments or chambers to the upper compartment, through the stuffing boxes for the flag rods, will be reduced.

A dependent object is to devise a construction of gland, to replace the stuffing boxes as at present used, which will be very efficient in operation in preventing the passage of gas without causing undue absorption of the gas pressure.

Another dependent object is to provide a slide valve of novel design and construction which will be very efficient in operation, which will enable the gas passageways to be straightened so that friction in the flow of gas will be reduced, which will have gasways of relatively large area so that the flow of gas therethrough will not be restricted, and which will have a relatively small working movement over the valve seating whilst still permitting a relatively large gas flow. It is desired that the valve cover be so constructed that the force for imparting reciprocating motion to the cover should be applied at the most suitable location so as to reduce rocking, lifting or tilting of the cover, thereby being conducive to freedom of movement at high speeds.

A further object of this invention is to provide a closed top gas meter wherein the gas pressure required to overcome the inertia of the movable parts of the meter and also to overcome the frictional resistance within the meter will be considerably reduced, with consequential material reduction in the pressure absorption by the gas meter. This will result in greater efficiency of operation, increased accuracy in the measurement of gas passing through the meter and a decrease in oscillation.

A still further object is to provide a dry gas meter which will be efficient in operation; in which the connections of the meter itself—not including the connections of the gas supply pipes to the meter will be of improved design and construction so that they may be effectively sealed against damage or undetected tampering; and which may incorporate an external casing, of ornamental and/or pleasing design if desired, made of moulded plastic material, cast iron, aluminium, or other material which need not necessarily be impervious to gas.

Another object is to provide a sturdy and relatively simple construction of gas meter which will enable the parts to be readily made and economically assembled by a judicious combination of skilled and unskilled labour, so that the cost of production will be relatively low, and having means for effecting repairs to, and cleaning and re-oiling of, the diaphragms whenever occasion may require.

With these and other objects in view I have designed a dry gas meter having a valve plate provided with trough-shaped valve seatings, and valve covers of complementary shape longitudinally sliable within the valve seatings, each of the valve covers having at least two gasways formed transversely through it and each valve seating having ports with which the gasways of the relative cover are adapted to register.

As a consequence of the provision of valves of this design the inlet and outlet pipes of the gas meter are connected directly to inlet and outlet gas conduits which are fastened to the valve plate so as to be in direct communication with the relevant ports of the valve seatings, and gas ducts connect the other ports of the valve seatings with the diaphragm chambers. Gas flowing from the inlet pipe to a diaphragm chamber, and from a diaphragm chamber to the outlet pipe, passes horizontally through the valve covers without rising above the upper surface of the said covers so that it does not enter the upper compartment.

Other features of the invention consist in a sealed inner casing housing the diaphragms; glands, for connection to the flag rods so as to prevent the escape of gas from the diaphragm chambers, consisting of tubular members of flexible gas-resistant material such as plasticized polyvinyl chloride or synthetic rubber of that type shown by the trade mark "Neoprene"; housings adapted to fit about the inlet and outlet pipes of the gas meter so that any gas which may escape from the inlet and outlet pipe connections to the inlet and outlet gas conduits will be prevented from entering the upper compartment of the meter; and means for locking the inlet and outlet gas pipes against rotation relative to the meter casing.

The features of the invention may be applied to a gas meter having the well known top-connections or it may be readily adapted to a meter having side connections for the gas supply lines.

In order that the several features of my invention may be clearly understood, the improved construction of gas meter will now be described in conjunction with, and by making reference to, the accompanying sheets of illustrative drawings. In these drawings Figs. 7, 8, 9, 10, 11, 12 and 13 are drawn on a larger scale than the remainder of the figures.

Reference is first made to the construction of gas meter and parts thereof illustrated in Figs. 1 to 13, inclusive.

The outer casing of the gas meter is made in two parts, the lower portion, or base, being indicated by the reference numeral 1 and the upper portion, or cover, by the numeral 2. The base 1 has studs or feet 3 on its underside to protect the meter against damage when mounted, and at its upper end it is formed with a flange 4 which, as illustrated, is inturned but may be formed externally of the casing base 1 or as a T—partly internal and partly external. The flange 4 is drilled and tapped, as at 5 (Fig. 4) for the purpose to be hereinafter described.

The cover 2 has along its lower edge a flange 6 similar to the flange 4 and at its opposite ends inwardly projecting housings 7 having vertical openings 8 formed therethrough. These housings may be formed integrally with the end walls, as shown, or they may be formed separated from said end walls. Concentrically with each of the openings 8 there is provided a shallow circular recess 9 on the top surface of the cover 2 and these recesses 9 provide seatings for thin gaskets or sealing washers 10. The cover 2 is drilled and tapped at two locations 11 on the transverse centre line, for the reason hereinafter set out. The front wall of the cover 2 has an opening formed therein at or near a central location and in said opening is fitted the glass face 12 for the index of the gas meter. It is preferred, for purposes of safety and to restrict liability of tampering, that said glass face 12 be fitted from within the cover 2.

Mounted within the outer casing, indicated by the reference numerals 1 and 2, is a sealed inner casing and valve plate assembly which incorporates all the working parts of the gas meter. The inner casing comprises a cylindrical shell 13 having a partitioning wall or division plate 14 securely fastened at a mid-point of its length to provide two opposite gas compartments 15 and 16. The opposite ends of the shell 13 are flanged outwardly, as at 17, to facilitate the fixture thereto of opposite end plates 18 by soldering or other suitable means.

Figures 5, 6:
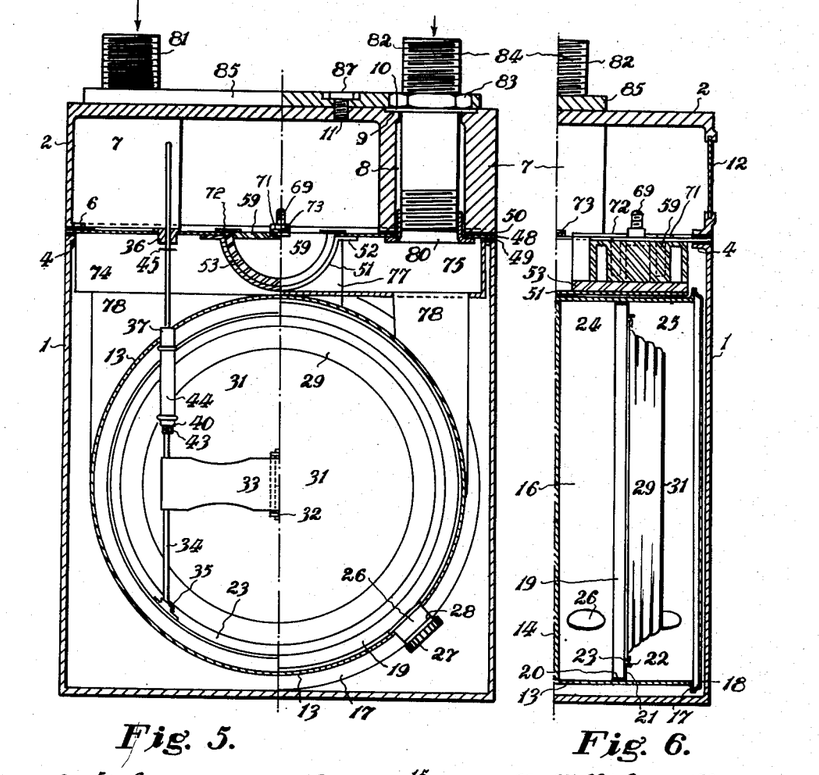
Fig. 5 illustrates a transverse section of the meter, as on the line 5—5 of Fig. 4—taken partly through one of the glands and partly on the transverse axis.
Fig. 6 shows a half longitudinal section of the gas meter, taken as on the line, and in the direction of the arrows, 6—6 of Fig. 4.
Figure 7:
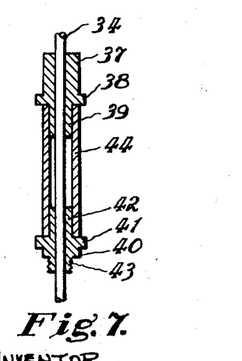
Fig. 7 is a vertical section through the gas-tight gland, illustrating the detailed construction thereof.
Figure 13:
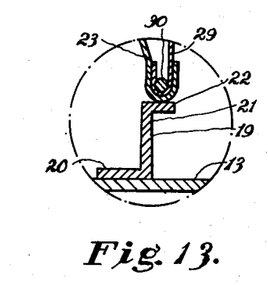
Fig. 13 illustrates the means adopted for securing the diaphragm within the cylindrical wall of the sealed internal casing.

A circular bracket 19 of the construction illustrated in Figs. 6 and 13 is firmly secured within each of the gas compartments 15 and 16 provided within the casing shell 13 and each bracket is positioned at or about a location midway between the wall 14 and the end plate 18. These brackets 19 are preferably constructed of sheet metal and they are of angled shape in cross section. Said brackets 19 consist of an outer limb 20, intermediate limb 21 and inner limb 22, the outer limb 20 being of such diametral size that it fits neatly within the shell 13 and is readily soldered, or otherwise secured, in fixed position. The intermediate limb 21 preferably extends inwardly at right angles to the outer limb 20 and may be relatively long so that the inner limb 22 is spaced some distance from the wall of the inner casing shell 13. This inner limb 22 is shown as being parallel to the outer limb 20 and it is relatively short in length. The circumferential ring 23 of the diaphragm is adapted to be soldered to the inner limb 22, the amount of heat required to produce an effective soldered joint being relatively low owing to the small amount of metal that is to be heated to the requisite soldering temperature. Consequently, the risk of burning the leather of the diaphragms in effecting that soldered joint will be greatly reduced.

As an alternative design to obtain the same result the bracket 19 may be made with the intermediate limb 21 relatively short and the inner limb 22 relatively long, the ring 23 being soldered to the outer end of said inner limb 22.

When the diaphragms are fitted within the compartments 15, 16, each of said compartments is divided into separate gas chambers 24 and 25.

The circular bracket 19, as well as serving to facilitate the assembly of the meter, also prevents any accumulation of water, heavy tarry material, or other deposit left by the gas from contacting and causing damage to the diaphragms. In order to ensure ready access to the interior of the casing 13 for the purpose of draining those deposits therefrom, cleaning the diaphragms and interior of the casing with kerosene or other suitable fluid and for subsequently re-oiling the diaphragms, a drainage ferrule 26 is provided within each of the four gas chambers 24 and 25. Each of these ferrules 26 is screwthreaded so that a stopper 27 may be readily fitted thereto to effect a closure. A washer or gasket 28 is positioned between the stopper 27 and the outer end of each ferrule 26 to make a gas-tight seal.

The construction of each of the diaphragms is conventional, the outer edge or rim of the oiled leather disc 29 being fixed within the circumferential ring 23 by means of a clamping wire 30 and the centre portion being clamped between two discoid plates 31. A bracket 32 is secured to the outer side of the discoid plates 31 at about a mid-position and one end of a flag 33 is hingedly connected to said bracket 32, the opposite end being fastened to a vertical oscillating rod 34 which has its lower end freely journaled in a bearing 35 mounted within the wall of the casing shell 13.

Each of the oscillatory rods 34 projects upwardly through the shell 13 and passes through a gland 36 fitted within an opening formed for the purpose in the valve plate, which is to be hereinafter described. In order to effect a gastight seal at that opening in the shell 13 through which each rod 34 projects, and at the same time permit freedom of oscillatory movement, I provide a sealing gland of the character illustrated in Figs. 5 and 7. A top guide or bearing member 37 is fastened within the wall of the shell 13, as by soldering, so that the joint is completely gastight, and the rod 34 passes through an axial hole in said member 37 and is freely rotatable therein. The member 37 has, at a mid-point, a circumferential flange 38 and a neck 39 of reduced diameter below said flange. A lower member 40 having an axial hole therethrough is firmly fastened, as by soldering, to the rod 34 at a suitable distance below the top member 37. This lower member 40 has, at a mid-point, a circumferential flange 41 and a neck 42, of the same diameter as the neck 39, above said flange. A resilient gland member 44 is securely fastened at its upper end to the neck 39 and at its lower end to the neck 42, and a thin metal washer 45 is soldered to the rod 34 immediately below the gland 36 to restrict the rod 34 from lifting. The gland member 44 may be fastened to the opposite necks 39 and 42 by the use of a suitable bonding medium, or by any other suitable means. If required to more readily effect that bonding, the outer surfaces of the necks 39 and 42 may be roughened or knurled in known fashion.

The gland member 44 is preferably made from synthetic rubber which will readily twist in a short arcuate movement upon the application of a very low torque. These synthetic materials are well known and most of them are impervious to town gas. Consequently, by careful selection, a suitable gland material is readily obtained. Alternatively, an oiled leather gland may be used and secured to the necks 39 and 42 by adhesives, or a torsion spring or by any other suitable means.

The valve plate 48 is of rectangular shape and it has, near its edges, a number of countersunk holes for the reception of fastening screws to secure said valve plate in position on the base member 1 of the outer casing. These holes and screws are provided at the locations indicated by the numeral 5 and said screws engage within the tapped holes formed at corresponding locations in the flange 4. In order to ensure a neat fitting of said valve plate 48 between the outer casing members 1 and 2 gaskets 49 and 50 are placed below and above the valve plate to seal the joints with the base member 1 and cover 2 respectively.

A channel-shaped support 51 having its opposite side extremities flanged outwardly at 52 is secured in position below the valve plate 48, preferably with its axis on the longitudinal centre line of the gas meter. This channel support 51 may be made in one continuous length, as shown, or it may be made in two separate sections disposed in parallel arrangement or set at 90° angularity. When the valves are arranged at that angularity it is preferred that the ports of the valve seatings 53 should be parallel with the division plate 14. Cutouts are made in the valve plate at appropriate locations to suit the dispositions of the channel-shaped support 51. The purpose of said cutouts will be made clear from the following description of the valve seatings and covers.

Figure 10:
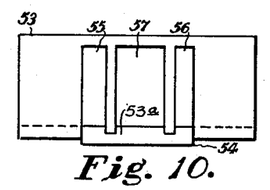
Fig. 10 shows, in side elevation, the valve seating made to suit the valve cover illustrated in Figs. 8 and 9.
Figure 11:
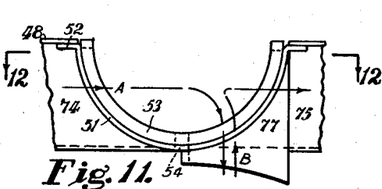
Fig. 11 is an end view, showing the gasways, of the improved valve and valve mounting.
Figure 12:
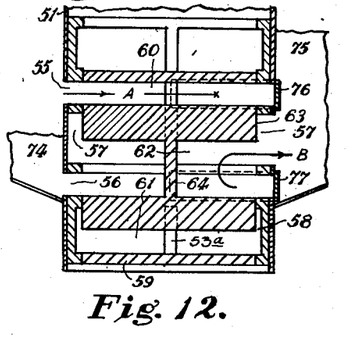
Fig. 12 is a horizontal section on the line 12—12 of Fig. 11, showing the valve cover in addition to the valve seating and valve mounting.

Accommodated within the channel support 51 are two similar valve seatings 53 of the construction illustrated particularly in Figs. 10, 11 and 12. These seatings are preferably made of valve metal and each seating is semi-circular in cross-section having a locating feather 54 on its undersurface to fit within a recess formed for the purpose in the channel 51. The end ports 55 and 56 and an intermediate port 57 are formed in the seating 53 on each of the opposite sides thereof so that a narrow rib or longitudinal partition 53a of metal remains between the ports at the opposite sides of the valve seating. The metal portions of the valve seating separating the gasways 55, 56 and 57 are relatively narrow so as to reduce the reciprocating travel of the valve cover and the wearing surfaces of the valve seating. If thought necessary, recesses 58 (Fig. 12) may be formed in the valve seating 53 at its opposite ends to reduce the wearing surface of said seating.

Figures 1, 2:
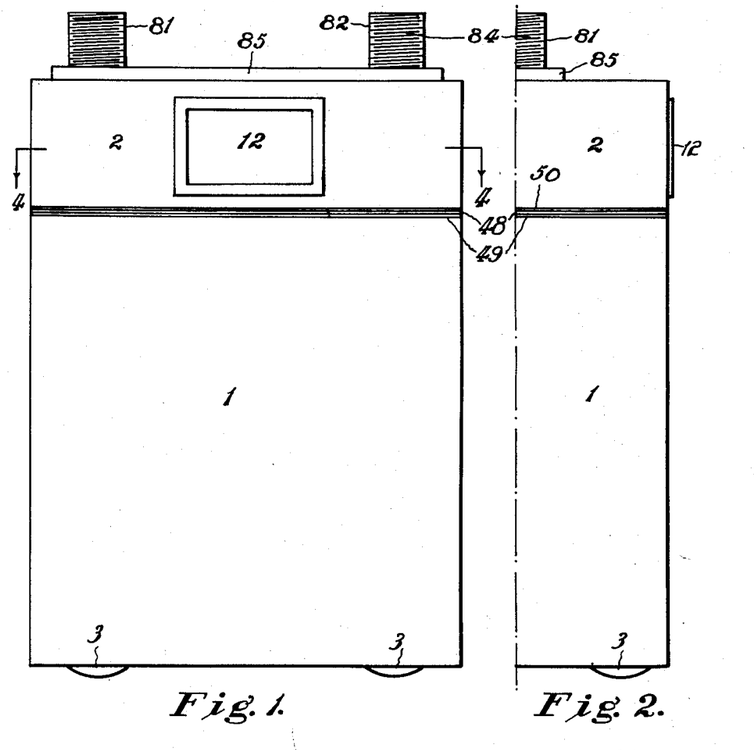
Fig. 1 is a front elevational view of one exemplary construction of gas meter incorporating the improvements I have devised.
Fig. 2 is a half-side view of the meter shown in Fig. 1.
Figure 3:
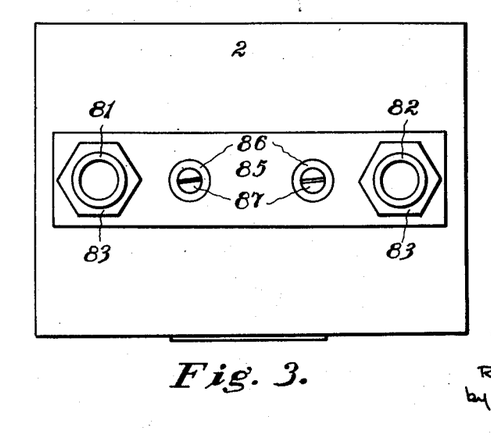
Fig. 3 is a top plan of the gas meter of the design illustrated in Fig. 1.
Figures 4, 8, 9:
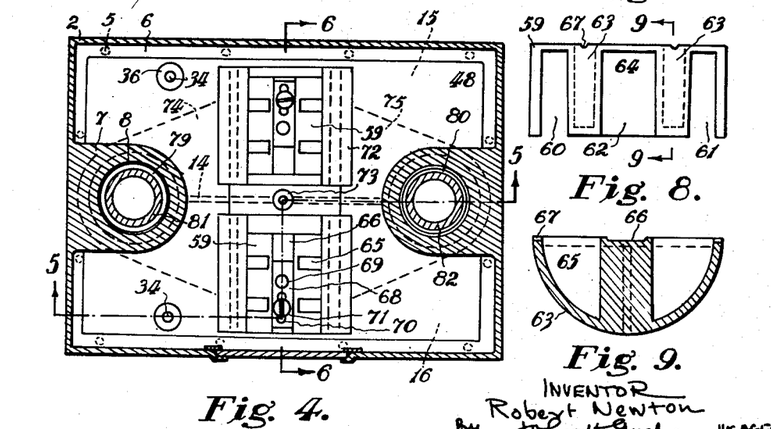
Fig. 4 is a horizontal section on the line, and in the direction of the arrows, 4—4 of Fig. 1.
Fig. 8 illustrates the sliding valve cover for the improved design of valve.
Fig. 9 is a cross-section on the line 9—9 of Fig. 8.

The valve cover 59 is of the design and construction illustrated by Figs. 8 and 9 and consists of a semi-cylindrical body—preferably made of metal—having through gasways 60 and 61 formed at its opposite ends. A transfer gasway 62 is constructed at an intermediate position and between each of said through gasways 60 and 61 and the transfer gasway 62 is a sealing face 63. A partitioning wall 64 links the two sealing faces 63 and registers with the longitudinal partition 53a of the related valve seating to provide a blockage and prevent the flow of gas through the valve cover at that location. The metal blocks made by the provision of the sealing faces are recessed at 65—as shown in Fig. 9—for the purpose of lightness and reduction of the amount of metal used in the manufacture of the valve cover. These recesses 65 also provide reservoirs for the storage of oil for lubricating the valve seating 53. In the top surface of the valve cover 59 there is formed, along the longitudinal axis of said cover, a shallow recess 66, and oiling grooves 67 are cut transversely from the recesses 65 to the side edges of the cover.

An adjustable sliding plate 68 is fitted within the recess 66 and the plate has, near its inner end, an upstanding shouldered stud 69 to which is fitted one end of the connecting link for driving the valve from the conventional crank (not shown) the double throw type of crank being required when the valves are in alignment as illustrated. A slot 70 is cut in the plate 68 near its outer end and through said slot is passed a screw 71 fitted within a screw-threaded hole formed near the outer end of the valve cover 59. By slackening the screw 71 the plate 68 may be moved slidably within the slot 66 to adjust the setting or timing of the valve cover 59 relative to the movement of the diaphragm 29.

Cover strips 72 overlie the opposite longitudinal edge portions of the valve cover and are fastened by means of screws to the upper surface of the valve plate 48. These cover strips 72 retain the valve covers 59 slidably in position on their seatings 53. Midway between the valve seatings 53 and on the longitudinal centre line of the meter there is fitted a bearing 73 to accommodate the lower end of the crank for operating the valves.

The mechanism for operating the valves from the vertical rods 34 and the index for recording the amount of gas that passes through the meter are not shown as these parts are of conventional design and any one of a number of standard mechanisms may be used.

Secured below the valve plate 48 are two oppositely disposed gas conduits 74 and 75. Each of these conduits is of outwardly tapering shape and their adjacent inner ends are fastened, as by soldering, to opposite sides of the channel 51. In that side of the channel 51 to which the conduit 74 is fastened there are formed four openings at locations corresponding to the ports 55 and 56 of the valve seatings 53, whilst in the opposite side of the channel 51—that is, the side connected to the conduit 75—there are provided openings, corresponding to the ports 57 of the seatings 53, leading directly to the conduit 75 and on opposite sides of said ports 57 openings corresponding to the ports 55 and 56. About these latter openings there are securely mounted downwardly extending ducts 76 and 77 which pass through the conduit 75—the injunction being sealed as by soldering—and are connected to the cylindrical shell 13. The shell 13 has openings formed in its wall at appropriate locations so that gas can flow through the port 55 and duct 76 to the gas chamber 24 or, alternatively, through the port 56 and duct 77 to the gas chamber 25.

Supporting columns 78 are fitted below the outer ends of the conduits 74 and 75 and the lower ends of these columns are secured to the outer wall of the cylindrical casing 13, thereby providing a firm and rigid connection of the valve plate assembly to the casing 13. These columns are of hollow construction and they may be in communication with the interior of the conduits 74, 75—as shown in Fig. 5—so that any material or moisture deposited in said conduits 74, 75 by the gas passing through the meter will run into said columns 78, thereby reducing the possibility of gas condensates from reaching the valve seatings.

At the outer end of each of the conduits 74 and 75 there are secured sockets 79 and 80, respectively, which extend upwardly through the valve plate 48. These sockets 79, 80 fit within the opening 8 of the housings 7 in the cover 2 when said cover is fitted over the valve plate 48, and are internally screw threaded to receive the lower ends of short connecting pipes 81 and 82, respectively. Each of these pipes 81, 82 has a flange 83 of hexagonal or other shape formed integrally near its upper end and the outer end of each pipe is externally screw-threaded at 84 to permit the connection of gas supply and delivery pipes (not shown).

A locking bar 85 is provided for the purpose of securely fastening the inlet and outlet gas pipes 81 and 82 against rotation once the cover 2 has been clamped in position, and said bar 85 also serves to prevent, or render readily detectable, any tampering or unauthorized interference with the gas meter. This locking bar has at its opposite ends openings of suitable shape to engage with flanges 83 on the connecting pipes 81 and 82. The locking bar thus prevents the rotation of said pipes 81, 82 when it is held flat on top of the meter cover 2. Counter-bored holes 86 are provided in the locking bar 85 so that screws 87 may be fitted therethrough to engage in the tapped holes 11 in the cover 2, thereby securely retaining said locking bar firmly in position. When the meter is assembled and the locking bar 85 is in position, seals are placed in position over the heads of the screws 87 by a competent authority so that, in order to tamper with a meter, the seals will need to be moved, thereby making such interference readily detectable.

It is apparent that the locking bar 85 will prevent the rotational displacement of the two pipes 81 and 82 during the installation of the gas meter and will, therefore, prevent the cover 2 from being loosened, which would possibly permit leakages of gas into the upper compartment. It is to be noted that there is no necessity for the connections of the pipes 81 and 82 with the sockets 79 and 80 to be rendered absolutely gas tight as leakages from those connections are rendered of little importance by the provision of the housings 8 and the gaskets 10 and 50.

In assembling the gas meter constructed as hereinabove described the ferrules 26 are fitted in position within the wall of the shell 13, the partition 14 is sealed within the cylindrical shell 13, the circular brackets 19 are fitted within the compartments 15 and 16, and the diaphragms are then secured to said brackets 19. The channel 51 is fitted with the valve seatings 53 and is mounted below the valve plate 48, the ducts 76 and 77 are fastened to the channel 51, sockets 79 and 80 are secured to the valve plate 48, conduits 74 and 75 are connected to the valve plate 48, and the columns 78 are soldered to the conduits 74 and 75. These columns 78 and ducts 76 and 77 are next connected to the casing 13—thereby rigidly mounting the valve plate 48 on the casing 13; flags 33 and glands 37 to 44 are fitted to the vertical rods 34 and these, with other necessary fittings and the bearings 35 and 36, are then mounted in position and the flags 33 connected to the diaphragms. The end plates 18 and stoppers 27 can then be secured in position and when this valve plate-internal casing assembly is completed the whole assembly can be fitted within the base 1 of the outer casing and fastened in place by the screws indicated at 5, the gasket 49 being first fitted to ensure a gastight seal.

The valve covers are then fitted within the seatings 53 and the cover strips 72 and crank bearings 73 are placed in correct position. The operating mechanism (not shown) for linking the valves to the rods 34 is then installed, with the recording or measuring index, also not illustrated, and the valves adjusted and set in correct position. In so setting the mechanism it will be found advisable to set the rods 34 so that they are in their mid-travel positions when the gland member 44 is in its unstrained state so that the said gland member 44 will be subjected to a minimum of torsional stresses.

The gasket 50 is placed over the valve plate 48 and the cover 2 is placed in position so that the housings 7 fit over the sockets 79, 80. The sealing washers 10 are placed in their recesses 9 and the pipes 81, 82 are then screwed into the sockets 79, 80. The action of screwing these pipes into their sockets causes the cover 2 to be clamped tightly on to the valve plate 48, the gasket 50 ensuring a gas-tight seal about the pipe-socket connections 79—81 and 80—82. The washers 10 provide additional sealing means against the escape of gas from the housing chamber 8 should the connections of the pipes 81 and 82 not be perfectly gas-tight. The pipes 81, 82 are tightened until the cover 2 is held tightly in position and until the flanges 83 are in correct position for fitment of the locking bar 85. Said bar 85 is then placed over the flanges 83 and screwed and sealed in position.

The locking bar 85 performs the subsidiary duty of reducing the stresses on the pipe-socket connections 79—81 and 80—82 when the supply and delivery gas connections are being made on the screwed ends 84 of the pipes 81 and 82 as the major portion of any torsional load will be absorbed by the material of the locking bar.

It will be noted from the foregoing description that the assembly procedure is relatively simple and the amount of manual operation is considerably reduced. In some few of the operations skilled labour is required but the major portion of the work can be performed by unskilled labour. Moreover, the testing of the meter and the adjustment of the tangent can be performed without the necessity of fitting a substitute cover and then removing it to make necessary adjustments as is customary with "open top" types of meters.

In the operation of the meter, the gas supply line is connected to pipe 81, the gas passes through the pipe 81 to the conduit 74 and in a straight passage through an inlet port 55 in one of the valve seatings 53, gasway 60 in the corresponding valve cover 59, the opposite or outlet port 55 in that valve seating, and straight down the duct 76 to the gas chamber 24—as indicated by the arrows A in Figs. 11 and 12. In that passage the gas is subjected to two turns only. At the same time gas will be ejected from the gas chamber 25 upwardly through the duct 77, outlet port 56, transfer gasway 62 in the valve 59, outlet port 57 in the valve seating 53 to the conduit 75, and thence out through the pipe 82. The outward passage through the valve is indicated by the arrows B of Figs. 11 and 12. In this flow, also, there are only two turns.

As the gas is passing from the conduit 74 through the inlet port 55 and gasway 60 gas is prevented from flowing through the inlet port 56 from the conduit 74 by the partitioning wall 64 in the valve cover 59.

When the valve cover 59 is moved longitudinally on its seating 53 the inlet port 55 is gradually cut off by the sealing face 63 adjacent the gasway 60 and, at the same time, the outlet port 56 is cut off by the face 63 adjacent the gasway 61. Immediately after these two ports are finally closed the inlet port 56 and the outlet port 55 are opened to permit the passage of gas through the gasway 61 in the valve cover 59, down the duct 77 to the chamber 25; at the same time gas is ejected from the chamber 24 upwardly through the duct 76 outlet port 55, transfer gasway 62 in the valve cover 59 and outlet port 57. The two valves, supplying the gas compartments 15 and 16, are set so that one valve leads the other by 90° in its travel so as to ensure a uniform and continuous supply of gas through the meter—as is customary practice.

Where it is desired, as is oftentimes found necessary, to supply lubrication to the valves a suitable lubricant is placed in the valve recesses 65 so that in the sliding movement of the valve covers 59 that lubricant is fed as required through the oiling grooves 67 to the cover strips 72 and valve seatings 53.

The movement of the diaphragms 29 causes the vertical rods 34 to oscillate about a vertical axis, the angularity of the movement being, for most constructions of meter, approximately 30°. During that movement the gland member 44 will be twisted first in one direction and then in the reverse direction, permitting relative freedom of movement of the vertical rod 34 whilst at the same time ensuring a gas-tight seal between the interior and exterior of the casing 13.

Figure 14:
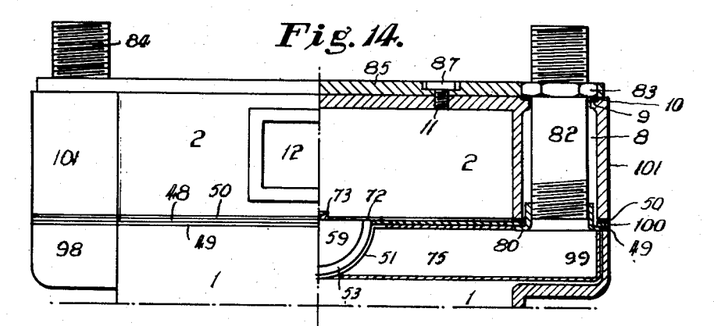
Fig. 14 illustrates, partly in front elevation and partly in transverse section, a modified construction of gas meter wherein the inlet and outlet gas pipes are spaced to suit the connection for the conventional "side connection" type of meter.
Figure 15:
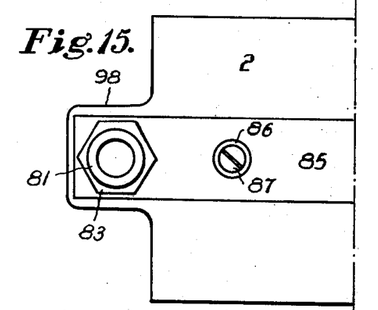
Fig. 15 is a half plan view of the meter shown in Fig. 14.
Figure 16:
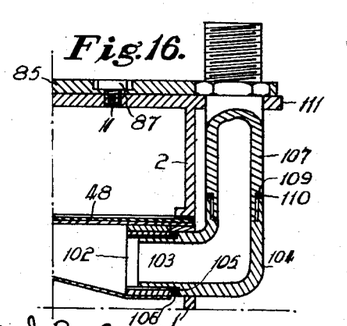
Fig. 16 is a half transverse section of a side connection type of meter incorporating slightly modified connections for the inlet and outlet pipes.

The gas meter described with reference to, and as illustrated by, Figs. 1 to 6 is a meter having the gas delivery effected through the top of the meter. Figs. 14 and 15 illustrate the adaptation of the "top connection" type of meter to suit the spacing of the inlet and outlet gas pipes of the "side connection" meter arrangement of parts. Fig. 16 shows the meter casing as constructed to suit a "side connection" meter, the meter incorporating the features of this invention and, at the same time, having the gas supply and delivery pipes connected through the side of the meter. This latter construction permits the use of improved procedure in assembling the valve plate and casing of the meter.

As shown in Figs. 14 and 15 the gas meter consists of the same features of design and construction as the meter illustrated in and by Figs. 1 to 6 with the exception that the inlet and outlet pipes are spaced a greater distance apart than the inlet and outlet pipes of the "top connection" meter hereinbefore described. This is due to standardised production and installation requirements so that the connections therefor will be similar to the connections for the "side connection" type of meter.

In this construction the base 1 has bays 98 formed integrally with the opposite side walls and these bays are adapted to accommodate side extensions 99 of the gas conduits 74 and 75. Sockets 79, 80 are secured in said extensions 99, as hereinabove described, and they project upwardly through lug extensions 100 of the valve plate 48. The top cover 2 has side bays 101 of shape similar to the bays 98 and these bays 101 constitute housings similar in operation to the housings 7, having openings 8 to accommodate the sockets 79 and 80 and the pipes 81 and 82. Recesses 9 in the top of the cover 2 provide seatings for gaskets 10 as heretofore described and the parts of the meter are assembled in manner similar to the assembly of the meter described with reference to Figs. 1 to 6. The locking bar 85 is longer than the locking bar for the meter shown in Figs. 1 to 6 but is fastened in position and operates in the same manner.

Fig. 16 illustrates a further modified construction of casing and valve plate assembly, as adapted to a "side connection" meter and not having housings to fit about the inlet and outlet pipes. In this construction each of the conduits 74, 75 has a co-axial socket member 102 at its outer end extending horizontally outwardly, and the opposite side walls of the outer casing base 1 have formed therein openings through which are fitted the inlet branches 103 of elbow connections 104. The inlet branch 103 of each elbow connection 104 is shouldered at 105 and the neck so formed is externally screw threaded so that said elbows may be secured into the respective sockets 102. A gasket 106 is fitted between the outer end of each socket 102 and each shoulder 105 to ensure a gas tight seal.

The elbow connections 104 are internally screw-threaded at their upper ends to permit the connection thereto of inlet and outlet gas pipes 107. These pipes are similar in all respects to the gas pipes 81 and 82 with the exception that they are of reduced diameter at their lower ends, providing shoulders 109. A gasket 110 is fitted on the lower screw-threaded end of each of the pipes 107, to be clamped between the upper end of the relevant elbow connection 104 and the shoulder 109 to thereby provide a gas tight seal of the connections of the pipes 107 with the elbows 104.

The top cover is constructed slightly differently to the cover 2 illustrated for the top delivery meter in Figs. 1–6. This cover has side extensions 111 having openings to accommodate the inlet and outlet pipes 107 formed vertically therein. The locking bar 85 is similar to the locking bar for the meter shown in Figs. 14 and 15.

In the assembly of the meter the elbow connections 104 are screwed into the sockets 102 until they are tight and in a vertical position as shown. The cover 2 is then fitted in position and the pipes 107, 108 are screwed into the elbow connections 104 to clamp said cover tightly down on the valve plate 48. The locking bar 85 is then fitted and sealed in the manner already described with reference to the "top connection" type of meter. Moreover, it is to be noted that with this construction the necessity for fastening the valve plate 48 to the base 1—achieved by use of the screws fitting through holes in said valve plate and engaging in the tapped holes 5 in the flange 4—is eliminated as the fitting of the pipe connections 107, 108 firmly clamps the top cover 2 and valve plate 48, with the gaskets 49 and 50, to the base 1. The casing is thus assembled without the use of screws.

The gas meter constructed in accordance with this invention will be found to possess features which will be of particular importance in use. The trough shaped valve is of extremely useful design as it permits a high rate of flow of gas and, moreover, the amount of gas passing through the valve can be raised by increasing the transverse area of the valve—increasing the diameter in the case of the valve shown in Figs. 8 and 9—when the gasways will be increased proportionately. The valve cover has a relatively short travel in its reciprocatory movement and is, therefore, particularly suited to high capacity gas meters. Moreover, by reason of the particular design of the valve it will be found that there is no necessity to have the end guides which are normally employed where D-slide valves are used.

The valves are also of importance in that they form a seal between the lower chamber of the gas meter and the upper chamber, effectively preventing the gas from rising into said upper chamber. As an additional feature is their ease of manufacture and the fact that they can readily be made to fine limits of accuracy and kept to predetermined sizes.

Another feature of major importance is the resilient, gas-resistant gland that replaces the stuffing boxes normally employed for the purpose of effecting a gas-tight seal between the upper and lower compartments of the gas meter. Those stuffing boxes are relatively inefficient in that they are very rarely gas-tight, they set up relatively great frictional forces if tightened in an endeavour to make a gas tight seal, and are a general source of trouble, as the packings in them wear. The gland which forms a part of my invention permits the making of a commercially gas-tight inner casing wherein the gas is retained, thereby ensuring that the upper chamber of the meter is kept free from gas. This freedom from gas will permit the use of plastics in the manufacture of the outer casing as the outer casing it not subjected to gas action when the sealed inner casing and resilient gland are used. This gland also considerably reduces the resistance of the meter and consequently reduces absorption of pressure by the meter.

The housings provided in the top cover of the outer casing also act, in the "top connection" type of meter, to prevent the escape of gas to the upper gas chamber. But, if so required, these housings may be dispensed with. When that is done the gas pipes 81 and 82 will preferably be shouldered near their lower ends, as is illustrated in Fig. 14, so that they are tightened on to those shoulders when the cover 2 is clamped in position, gaskets 106 being fitted about their lower ends to ensure a gas tight seal.

The construction of the meter casing, and of the gas conduits within the casing, will be found to be extremely meritorious as the amount of manual labour required to manufacture the meter is considerably reduced and the production of the meter, as an entirety, is considerably simplified.

The assembly of the meter is relatively simple and permits the use of unskilled as well as skilled labour. The final stage of the assembly is effected by the fitting of the pipes 81 and 82, from the outside of the meter, into the sockets 79 and 80 so that the cover is tightly clamped in position and then fastening the locking bar 85 securely in position.

The major features of the invention hereinabove described combine to provide a gas meter of high capacity without the disadvantages associated with the "open top" type of meter. The top of this gas meter will be free from the contamination of gas, thereby permitting a more efficient operation of the crank and linkage mechanisms and avoiding discoloration of the index glass 12 whilst at the same time greatly facilitating the adjustment and testing of the meter. As a result of the reduction of the resistance of the meter to the gas flow—achieved by the "straight through" flow in the valves and the provision of the flexible gas-resistant glands—the pressure absorption will be greatly reduced, and consequently so also will be oscillation in the gas pressures.

What I do claim is:

1. In a dry gas meter having at least one gas compartment with a diaphragm extending thereacross to divide the gas compartment into two separate gas chambers; the combination of a valve plate, a trough-shaped valve seating for each gas compartment mounted on said valve plate, said trough-shaped valve seating having two pairs of transversely arranged end gas ports and a pair of transversely arranged transfer ports disposed intermediate said pairs of end gas ports, an inlet gas conduit communicating with one of the end gas ports of each of said two pairs at one side of said valve seating, an outlet gas conduit communicating with the one of said pair of transfer ports at the other side of said valve seating, a first gas duct extending from the other end gas port of one of said pairs of end gas ports to one of the separate gas chambers, a second gas duct extending from the other end gas port of the other of said pairs of end gas ports to the other of the separate gas chambers, and a valve cover slidable longitudinally on said seating and of complementary configuration thereto and having two gasways extending transversely therethrough adjacent the opposite ends of the valve cover and a transfer gasway extending partly across said valve cover between said two gasways and opening towards said other side of the valve seating, said two gasways extending through the valve cover being spaced apart longitudinally for alternative registration with either one of said two pairs of end gas ports and said transfer gasway being dimensioned to simultaneously register with the transfer port at said other side of the valve seating and with the end gas port at said other side of the valve seating which is of the pair of end gas ports then out of registration with said gasways extending through the valve cover, so that gas is directed from said inlet conduit through said valve cover and into one of the gas chambers and out of the other gas chamber through the valve cover and into said outlet conduit.

2. In a dry gas meter having at least one gas compartment with a diaphragm extending thereacross to divide the gas compartment into two separate gas chambers and having diaphragm actuated mechanism; the combination of a valve plate disposed above the gas compartment, a trough-shaped valve seating for each gas compartment mounted on said plate, said trough-shaped valve seating having two pairs of transversely arranged end gas ports opening at the opposite sides thereof and a longitudinal partition at the bottom of said seating separating the end gas ports at one side of said seating from the end gas ports at the other side of said seating, said valve seating further having a transfer gas port at least at said other side of the valve seating and disposed between the end gas ports at the related side of the seating with said longitudinal partition defining an edge of said transfer port, an inlet gas conduit opening into said end gas ports at said one side of the valve seating, an outlet gas conduit communicating with said transfer gas port at said other side of the valve seating, a first gas duct extending from one of said end gas ports at said other side of the valve seating for communication with one of the gas chambers, a second gas duct extending from the other of said end gas ports at said other side of the valve seating for communication with the other gas chamber, and a valve cover slidable longitudinally on said valve seating and of complementary configuration, said valve cover having two gasways extending transversely therethrough adjacent the opposite ends of the valve cover, the longitudinal distance between said two gasways being greater than the longitudinal distance between said pairs of end gas ports so that said gasways are selectively registerable one at a time with either of said pairs of end gas ports, said valve cover further having a transfer gasway extending partly across said valve cover between said two gasways and opening toward said other side of the valve seating, said transfer gasway being dimensioned to simultaneously register with said transfer port at said other side of the valve seating and with the one of said end gas ports at said other side of the valve seating which is then out of registration with the gasways extending through the valve cover so that gas is directed from said inlet conduit through said valve seating and cover to one of the gas chambers and from the other of the gas chambers through said valve seating and cover to said outlet conduit.

3. In a dry gas meter; the combination according to claim 2, wherein said valve cover is formed with a flat upper surface having a recess therein to receive a suitable lubricant.

4. In a dry gas meter; the combination according to claim 2, wherein said valve cover has a longitudinally extending recess in the upper surface thereof, a plate fitting slidably in said longitudinal recess, means for securing said plate in a desired adjusted position within said longitudinal recess, and means on said plate for connection to the diaphragm actuated mechanism of the meter.

5. In a dry gas meter; the combination according to claim 2, further comprising retaining strips secured along the upper edge portions of said valve plate on the opposite sides of the valve seating and overlying the longitudinal edges of said valve cover to bear upon the upper surface of the latter and prevent tilting of the valve cover relative to the valve seating.

6. In a dry gas meter having at least one gas compartment with a diaphragm extending thereacross to divide the compartment into two separate gas chambers and having diaphragm actuated mechanism; the combination of a valve plate disposed above the gas compartment, an upwardly concave, semi-cylindrical valve seating mounted on said valve plate for each gas compartment of the meter, said valve seating having two pairs of transversely arranged end gas ports opening at the opposite sides thereof and a partition extending longitudinally at the bottom of the seating and separating the end gas ports at one side of said valve seating from the paired end gas ports at the other side of the valve seating, said valve seating further having a transfer gas port at least at said other side of the valve seating and disposed between said end gas ports with said longitudinal partition defining the lower edge of said transfer gas port, an inlet gas conduit opening laterally into said end gas ports at said one side of the valve seating, an outlet gas conduit extending laterally from said transfer gas port at said other side of the valve seating, a gas duct extending downwardly from each of said end gas ports at said other side of the valve seating for connection to a corresponding one of the separate gas chambers in the gas compartment, and a valve cover of semi-cylindrical outer contour sliding longitudinally in said valve seating, said valve cover having a gasway extending transversely therethrough adjacent each of the opposite ends thereof, said transverse gasways being spaced longitudinally apart for alternative registration with a corresponding pair of said end gas ports, said valve cover further having a longitudinal partition extending between said transverse gasways and registering with said partition of the valve seating and a transfer gasway opening downwardly and laterally at the side of said longitudinal partition facing toward said other side of the valve seating, said transfer gasway being dimensioned to simultaneously register with said transfer port and with the one of said end gas ports at the other side of the valve seating which is then out of registration with the corresponding transverse gasway of the valve cover so that gas is directed from said inlet gas conduit through the registered end gas ports and transverse gasway of said valve seating and cover and then downwardly through one of the gas ducts into the related gas chamber while gas is simultaneously directed out of the other gas chamber through the related gas duct and corresponding end gas port into the transfer gasway and port for discharge into said outlet gas conduit.

7. In a dry gas meter; the combination according to claim 6, wherein said valve cover has a flat upper surface formed with at least one recess therein for the reception of a suitable lubricant.

8. In a dry gas meter; the combination according to claim 6, wherein said valve cover has a longitudinally extending recess in the upper surface thereof, a plate slidable longitudinally in said recess, means for securing said plate in a desired adjusted position within said longitudinal recess, and means on said plate for connection to the diaphragm actuated mechanism of the meter.

9. In a dry gas meter; the combination according to claim 6, further comprising retaining strips secured to said valve plate along the upper edge portions of said valve seating and overlying the longitudinal edge portions of said valve cover to bear down on the latter and prevent tilting of the valve cover relative to the valve seating.

ROBERT NEWTON.

References Cited in the file of this patent

UNITED STATES PATENTS

| Number | Name | Date |
|---|---|---|
| 477,910 | Milsted | June 28, 1892 |
| 505,715 | Milsted | Sept. 26, 1893 |
| 637,424 | Seymour | Nov. 21, 1899 |
| 654,309 | Ehebald | July 24, 1900 |
| 686,773 | Seymour | Nov. 19, 1901 |
| 790,142 | Lichetti | May 16, 1905 |
| 1,090,864 | Knight | Mar. 24, 1914 |
| 1,120,262 | Anderson | Dec. 8, 1914 |
| 1,791,436 | Ullrich | Feb. 3, 1931 |
| 1,807,139 | Volodimirov | May 26, 1931 |
| 1,984,100 | Schutz | Dec. 11, 1934 |
| 2,065,007 | MacLean | Dec. 22, 1936 |
| 2,301,262 | Dixon | Nov. 10, 1942 |
| 2,395,963 | Fergusson | Mar. 5, 1946 |
| 2,441,618 | Cole | May 18, 1948 |

FOREIGN PATENTS

| Number | Country | Date |
|---|---|---|
| 175,846 | Great Britain | Mar. 2, 1922 |
| 3,079 | Australia | July 16, 1931 |
| 395,184 | Great Britain | July 13, 1933 |
| 400,181 | Great Britain | Oct. 16, 1933 |
| 424,351 | Great Britain | Feb. 20, 1935 |